United States Patent [19]

Reinhardt

[11] 4,186,101
[45] Jan. 29, 1980

[54] FILTER

[75] Inventor: Erich K. Reinhardt, Bietigheim-Bissingen, Fed. Rep. of Germany

[73] Assignee: Schumacher'sche Fabrik GmbH & Co. KG, Bissingen, Fed. Rep. of Germany

[21] Appl. No.: 869,298

[22] Filed: Jan. 13, 1978

[30] Foreign Application Priority Data

Jan. 20, 1977 [DE] Fed. Rep. of Germany ....... 2702210

[51] Int. Cl.² .................... B01D 39/04; B01D 39/06
[52] U.S. Cl. ................................ 210/497 R; 210/508; 210/509; 55/524; 55/528
[58] Field of Search ................... 210/496, 497 R, 508, 210/509; 55/488, 489, 524, 527, 528

[56] References Cited

U.S. PATENT DOCUMENTS

| 2,687,363 | 8/1954 | Manning | 210/496 X |
| 3,053,775 | 9/1962 | Abbott | 210/509 X |
| 3,112,184 | 11/1963 | Hollenbach | 210/496 |
| 3,121,698 | 2/1964 | Orsino et al. | 428/35 |
| 3,599,797 | 8/1971 | Mikulski et al. | 210/496 |
| 3,933,643 | 1/1976 | Colvin et al. | 210/508 X |

Primary Examiner—William A. Cuchlinski, Jr.
Attorney, Agent, or Firm—Kenway & Jenney

[57] ABSTRACT

A self-supporting filter consisting of a plurality of fibre flakes distributed as fibre cells throughout a matrix. The matrix is preferably made of a porous material. The fibre flakes are agglomerations of short fibres. The filter is made by mixing fibre flakes and a binder, compressing the mixture in a mould and hardening the binder by a dry process to produce the matrix.

30 Claims, 4 Drawing Figures

FILTER

The present invention relates to a compound filter in which a plurality of fibre flakes are connected to a matrix. The invention also relates to a process for producing such a filter.

Rigid filters which do not require separate supports are already known. Such filters may be used for filtering both liquids and gases. They can be used to filter out large particle fogs; they operate satisfactorily even when the fog droplets are from 5-10 $\mu$m. in diameter. The fibres used in these filter bodies may be made of glass and in the form of, for example, tangled fibre fleece mats. In such a case, the fleece mats may be wound upon a core which is later removed. This winding is subsequently impregnated with, for example, a dissolved or dispersed phenol resin and then heated. The purpose of this treatment is to form a hard and mostly homogeneous self-supporting structure. An alternative to the use of a core is a wet process similar to that used in paper making. In this case, a mash of fibres and, for example, an emulsion of phenol resin and water is produced. The mash is then subjected to vacuum or pressure filtration to remove as much water as possible. After this, the dried mash is put into a mould. The filled mould is then heated to form a self-supporting structure during which time any remaining water is evaporated with a high expenditure of energy. This causes the glass fibres to be connected to one another at their crossing points by means of the phenol resin. In such filter bodies the weight ratio of fibres to binding agent is preferably from 1:0.1 to 1:0.2. In such a filter it is the fibres that give the filter body rigidity.

We have now discovered a new filter which has the advantages of the construction described above, namely high rigidity, but which is considerably simpler and therefore more economical to produce and which also has higher separating power in the sub-micron range.

Thus, the present invention consists in a filter in which a plurality of filter cells is distributed throughout a matrix (preferably one made of porous material), each of said filter cells containing compressed filter flakes anchored at their periphery to said matrix.

The invention also consists in a process for producing the filter of the invention, which comprises mixing fibre flakes and a binder (preferably a powder-like binder), putting the resulting mixture in a mould, compressing the mixture such that the fibre flakes are compressed and solidifying the binder by a dry method to form a matrix.

In this new filter body the filter cells are held in the matrix and each of them forms an extremely fine filter having a particular packing density, size and shape. The individual fibres in the interior of the fibre flakes do not bond with the matrix. Instead, it is the edges of the flakes which bond with the material of the matrix. This arrangement prevents the agglomeration due to surface tension of the individual fibres of the fibre flakes when the material is wetted. As a result, a reduction in flow and deterioration in the separating efficiency of the filter is avoided. This means that, when the filter is impregnated with liquid, the porosity of the fibre structure within the filter cells, the pressure drop across the filter and, therefore, the separating efficiency of the filter remain substantailly constant. In the present invention, the fibre flakes, which are enclosed in the matrix, are fibres of short length which have been clustered together to form fibre aggregates. The individual fibres may be fixed relative to one another, for example by a resin bond, or they may be simply in the form of a disorientated unbonded tangled fibre fleece. This second possibility offers a considerable advantage since fibre flakes produced in this way contain in their interior fibres whose total surface is unchanged and thus available for the separating process.

The matrix, which contains the fibre flakes, may contain an impermeable material. In this way, the fluid to be filtered must pass mainly through the compressed fibre flakes or filter cells which will be present in the matrix in such numbers that they give rise to inter-connected pathways through the filter.

The separating efficiency of a fibre filter is, in general, dependant to a considerable extent on the following factors: the diameter of the fibres, their surface condition; their packing density; their special orientation; the length of the filtration path; the properties of the particle to be removed (examples of such particles include liquid mists, aerosols and other gas-conveyed particles, such as bacteria or viruses); the particle size distribution in the case of, for example, dispersed liquids (viscosity and surface tension are involved here); the concentration of the particles; and especially the flow speed of the liquid.

When these factors are taken into account, it can be seen that the separating process works considerably better if the matrix is porous to a high degree. In this case the fibre flakes are in mutual contact through pores in the wall of the cavities which accommodate them and during filtering the following effect may be obtained. The porous cell wall of the filter body gives rise to a multi-stage separating effect in the flow direction of the fluid. This occurs because the cavities in the matrix which accommodate the individual fibre flakes permit a series of separations to occur side by side but locally partly separate. In the wall region of the cavities separation is mainly impact and inertia separation, whereas in the pure fibre compound of the filter cells separation is predominantly by diffusion.

Filters of this construction may also be used for treating highly aggressive sub-micronic fogs and at fairly high temperatures. For use in this manner it is simply necessary that the matrix and fibres have sufficient chemical and thermal resistance. Until now, the filters used to treat highly aggressive fogs have consisted of, for example, glass fibres or mixtures of glass fibres of different fibre lengths mounted between two concentric hollow cylindrical filters, these filters in turn being arranged to be connected to a gas stream by means of suitable sealing elements. These filters are technically complicated and their support filters require certain corosion-resistant materials. They are, therefore, expensive to produce. Furthermore, the proportion of thicker glass fibres which is needed to counteract agglomeration when the filter is wetted reduces separation efficiency.

The structure of the filter of the present invention ensures a separating mechanism which results in an optimum all-over efficiency. This separating mechanism is described below.

The filter of the present invention may be porous because of two effects—the porosity of the material of the matrix and the presence of permeable fibre flakes. A liquid flowing through the filter will, therefore, experience a velocity jump from a matrix pore to a filter cell. This nearly sudden change in the local flow speed provides optimum separating conditions for certain particle sizes. Thereby a speed profile is set up which changes abruptly and continuously in the flow direction of the fluid; this is a condition for optimum separation of fogs or aerosols of different particle size and especially of those in the sub-micron range.

Because of the given multiplicity of the interposed pore and cell systems within the filter, a break-through of particles through the filter cannot occur with certainty. This is true even in the case of large and/or fast changes in the flow speed of the fluid as well as strongly fluctuating properties of the particle collective.

The fibres forming the fibre flakes may comprise a wide variety of materials. Examples of these materials include; a glass and/or mineral; a thermo-setting resin; a thermo-plastic resin; an organic material, for example cotton; and carbon.

The matrix may be formed from any suitable cold or hot setting material. Examples of suitable materials include: a glass; a ceramic material; a glass or a ceramic material together with a synthetic resin; a synthetic resin; and an organic material which may be coked or graphited.

The separating efficiency of a filter depends inter alia upon the length of the flow path through the filter cells. This is particularly true in the case of particles of sub-micron size. For this reason, at least a considerable proportion of the compressed fibre flakes should be much longer in a direction parallel to the flow than in a direction perpendicular to the flow.

Optimum filtration of sub-micron sized particles may be obtained when the diameter of the fibres is from 0.05 $\mu m$ to 5 $\mu m$ and especially when below 1 $\mu m$. Production of the filter is easier when all the fibres of a filter cell have substantially the same diameter.

The filter body according to the invention may be conveniently produced by forming fibre flakes from short fibres and mixing the flake with a binder, preferably a powder-like binder. The resulting mixture is put in a mould and is compressed in the mould to a fraction of its original volume, thereby compressing the fibre flakes. Finally the binder is solidified in a dry manner to form a rigid matrix. The dry solidification of the matrix ensures that the flake fibres do not agglomerate before they are bonded into the solidifying material of the matrix. The solidification of the matrix is preferably brought about thermally. The fibre flakes used in the production of the filter are preferably such that the ratio between their volume when loose prior to the compression to their volume after insersion of the matrix is from 2:1 to 8:1 and preferably 5:1. This means that when the material put in the mould is compressed the fibre flakes are deformed; the pressure will advantageously be exerted transverely to the desired flow direction of the fluid to be filtered. This will press the filter cells flat thus making their smallest dimension transverse to the flow direction. This will mean that the fluid to be filtered must travel through the longest possible filtration path. However, it is possible, and this depends on the method of production used, to abandon the preferred orientation of the compressed filter cells but in this case at least an increase in the pressure loss must be accepted.

A satisfactory separating effect as well as sufficient rigidity of the filter body can be obtained when at least two matrix flakes lie one behind the other in the flow direction of the matrix.

The production of the fibres may be carried out in various ways. They are preferably produced by severing fibres from a fleece. In this method the very process of severing may result in a hooking together of individual fibres which may lead to a coherent flake. Alternatively, pressed fibre material may be used as starting material for the production of the flake. Here, the material will have to be converted into flakes of defined magnititude by comminuting and appropriate after-treatment. The fleece or the packed fibre material used for making the fibre flakes will be prepared containing fibres preferably from 2 mm. to 15 mm. in length. The matrix is preferably formed by mixing the fibre flakes and a binder in a weight ratio of from 1:1 to 1:6 and preferably 1:3.5.

The invention is further illustrated with reference to the accompanying drawings in which.

Figure 1:
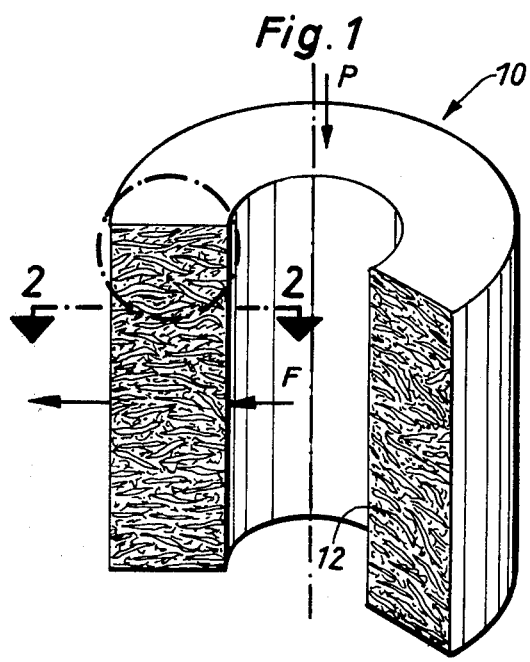
FIG. 1 is a perspective view of a part of a hollow cylindrical filter.
Figure 2:
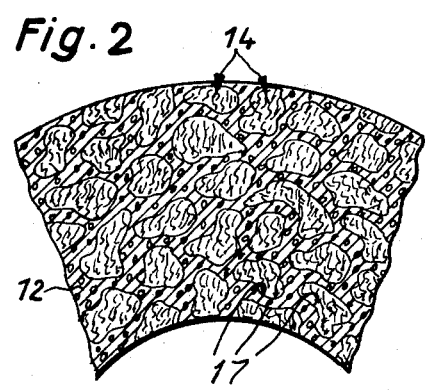
FIG. 2 is a partial section from the line 2—2 through the hollow cylindrical filter of FIG. 1.
Figure 3:
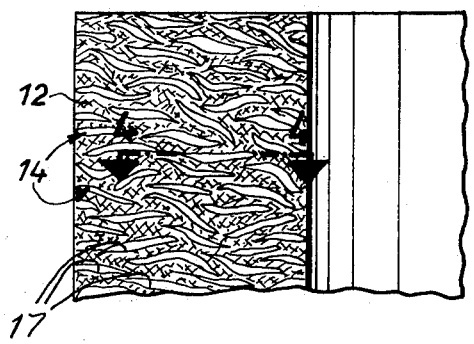
FIG. 3 is the portion of a cut face of a hollow cylindrical filter indicated in FIG. 1 by a dash-dotted circle.
Figure 4:
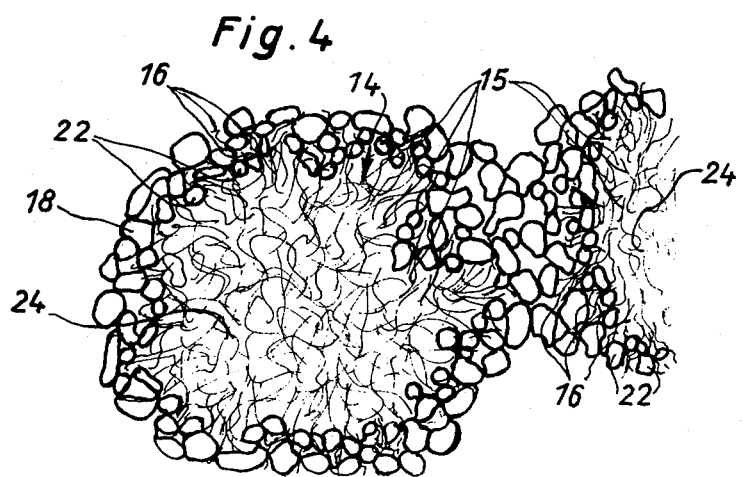
FIG. 4 is a magnified view of a partial section on the line 4—4 through the filter of FIG. 3.

In FIG. 1, the hollow cylindrical filter (10) contains a matrix (12) which acts as a support for the filter and which consists of a material which is porous in the solidified state. Examples of a suitable material include ceramic materials and suitable synthetic resin materials. Filter cells (14) are enclosed in such a matrix and each one is filled with a fibre flake formed from a fibrous mass. The fibre flakes may consist of, for example, glass fibres. The fibres (15) present at the surface of the flake or the ends of the fibres (16) are retained in the matrix. FIGS. 3 and 4 illustrate the inclusion of the fibre flakes in the matrix. A permeable cell wall (18) is nearly always located between cavities (17) which contain the fibre flake of the individual filter cells (14). These permeable walls merge in the direction of the filter cell into a more loosely formed wall region in which the individual fibres (15) of the fibre flake are mixed with wall material (22). It is in this peripheral region of the fibre flakes than an efficient anchoring thereof to the matrix is achieved. Such an arrangement can be seen in FIG. 4. This transitional region is followed by a cell nucleus (24) consisting of fibres (15) and the fibres here are also anchored, to a large extent, by the ends (16) in the matrix. This means that the fibre flakes are more or less clamped to or anchored in the walls of the cavities. This mounting of the fibre flakes in the matrix ensures that individual fibre pieces cannot agglomerate when the filter is wetted—this prevents a change of the flake assembly which would impede the flow of fluid through the filter. Consequently the separation that occurs within the permeable cell wall (18), in the more loosely formed wall regions and within the filter cells (14) is substantially an impact and/or inertia separation. In contrast, when the finest fibres are used, predominantly diffusion separation takes place in the interior of the cell nucleii (24). Thus the filter bodies shown form a filter medium in which the glass fibres forming the fibre flakes and the porous matrix both contribute to the high separation efficiency.

As may be seen from FIG. 1, in the finished state of the filter body the filter cells are advantageously compressed in a direction indicated by an arrow P. This is substantially perpendicular to the direction in which a fluid will flow through the filter; this direction is indicated by arrow F.

During production of the filters the fibre flakes are present in the form of small pads and when they are compressed they become flat structures orientated in the matrix in such a manner that they are located substantially in a plane normal to the direction of the force P effecting the compression. This compression of the fibre flakes leads necessarily and intentionally to an increased packing density and thus to a correspondingly longer separation path. This favours the filtration process since it results in a higher degree of separation.

The production of filter bodies of any desired cross-sectional shape may be carried out in various ways. Filter bodies may be produced by, for example, introducing the flake material, together with a binder, into an appropriate mould and tamping, pressing or radially packing it. In this way, monolithic moulded bodies of very large dimensions (for example several metres in length and up to one metre or more in diameter) may be produced without difficulty. Finally, a particularly advantageous way of making the filter is as follows. The material may be produced by a rod extrusion method in a cylindrical, hollow cylindrical or plate-shaped configuration. These methods are particularly suitable for mass production.

We claim:

1. A rigid filter for filtering a fluid comprising a matrix, a plurality of fibre flakes composed of fibres distributed as fibre cells throughout said matrix, said fibre flakes being compressed preferably in a direction perpendicular to that in which said fluid will flow, said fibre flakes being anchored by fibres located at the periphery of said flakes to said matrix.

2. A filter as claimed in claim 1, in which said matrix comprises a porous material.

3. A filter as claimed in claim 1, in which said fibre cells are distributed randomly throughout said matrix.

4. A filter as claimed in claim 1, which contains fibre flakes of more than one size.

5. A filter as claimed in claim 1, in which said fibre flakes comprise a material selected from the group consisting of a glass, a mineral, and an organic material.

6. A filter as claimed in claim 5, in which said organic material is cotton.

7. A filter as claimed in claim 1, in which said fibre flakes consists of carbon fibres.

8. A filter as claimed in claim 1, in which said matrix is a cold setting material.

9. A filter as claimed in claim 1, in which said matrix is a hot setting material.

10. A filter as claimed in claim 1, in which said matrix comprises a synthetic resin.

11. A filter as claimed in claim 1, in which said matrix is an organic material that can be coked.

12. A filter as claimed in claim 1, in which said matrix is an organic material that can be graphited.

13. A filter as claimed in claim 1, in which said matrix is a glass or a ceramic material.

14. A filter as claimed in claim 1, in which the fibre flakes comprise fibres of diameter from 0.05 $\mu$m to 5 $\mu$m.

15. A filter as claimed in claim 14, in which the diameter of said fibres is less than 1 $\mu$m.

16. A filter as claimed in claim 1, having a hollow cylindrical structure and having been compressed along its axis so that the fibre flakes are substantially flat and lying in a plane perpendicular to the axis of the filter.

17. A method of manufacturing a filter comprising a plurality of fibre flakes distributed as fibre cells throughout a matrix, which method comprises the steps: mixing fibre flakes and a binder; putting the resulting mixture in a mould; compressing the mixture such that the fibre flakes are compressed; and solidifying the binder by a dry method to form a matrix.

18. A method as claimed in claim 17, in which the ratio between the volume of the fibre flakes before the compression to the volume after the compression is from 2:1 to 8:1.

19. A method as claimed in claim 18, in which said ratio is about 5:1.

20. A method as claimed in claim 17, in which the fibre flakes are formed by severing fibres from a fleece.

21. A method as claimed in claim 17, in which the fibres of the fibre flakes form a coherent body by mutual interhooking.

22. A method as claimed in claim 17, in which the fibres of the fibre flakes are from 2–15 mm. in length.

23. A method as claimed in claim 17, in which the diameter of the fibres of the fibre flakes is from 0.05 $\mu$m to 5 $\mu$m.

24. A method as claimed in claim 23, in which the diameter of said fibres is about 1 $\mu$m.

25. A method as claimed in claim 17, in which 1 part by weight of said fibre flakes is mixed with from 1 to 6 parts by weight of said binder.

26. A method as claimed in claim 25, in which 1 part by weight of said fibre flakes is mixed with about 3.5 parts by weight of said binder.

27. A method as claimed in claim 17, in which said mould comprises two concentric cylinders, said mixture being put in the space between said cylinders and compressed in a direction parallel to the axes of said cylinders.

28. A filter as claimed in claim 1 wherein the dimensions of at least a substantial portion of the compressed fibre flakes are substantially greater in the direction of flow than in a transverse direction thereto.

29. A filter as claimed in claim 1 in which said fibre flakes are formed of a thermosetting resin.

30. A filter as claimed in claim 1 in which said fibre flakes are formed of a thermoplastic resin.

* * * * *

UNITED STATES PATENT AND TRADEMARK OFFICE
CERTIFICATE OF CORRECTION

PATENT NO. : 4,186,101
DATED : January 29, 1980
INVENTOR(S) : Erich K. Reinhardt It is certified that error appears in the above-identified patent and that said Letters Patent are hereby corrected as shown below:

Column 2, line 18 change "special" to --spacial--.

Column 4, line 7 change "magnititude" to --magnitude--.

Signed and Sealed this

Second Day of December 1980

[SEAL]

Attest:

SIDNEY A. DIAMOND

Attesting Officer     Commissioner of Patents and Trademarks